(12) United States Patent
Narita (10) Patent No.: US 8,515,168 B2
(45) Date of Patent: Aug. 20, 2013

(54) IMAGE PROCESSING APPARATUS AND IMAGE PROCESSING METHOD

(75) Inventor: Tateki Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 12/971,262

(22) Filed: Dec. 17, 2010

(65) Prior Publication Data

US 2011/0158525 A1   Jun. 30, 2011

(30) Foreign Application Priority Data

Dec. 25, 2009   (JP) ................................. 2009-296377

(51) Int. Cl.
*G06K 9/36* (2006.01)

(52) U.S. Cl.
USPC ............................ 382/166; 382/162; 382/244

(58) Field of Classification Search
USPC .......................................... 382/166, 162, 244
See application file for complete search history.

(56) References Cited

U.S. PATENT DOCUMENTS

| | | | |
|---|---|---|---|
| 6,526,180 B1 * | 2/2003 | Carley ........................... | 382/268 |
| 2002/0122109 A1 * | 9/2002 | Ehsani et al. .................. | 347/240 |
| 2002/0196467 A1 * | 12/2002 | Delhoune et al. ............. | 358/1.18 |
| 2005/0238245 A1 * | 10/2005 | Yao et al. ...................... | 382/244 |
| 2006/0117183 A1 * | 6/2006 | Hatano et al. .................. | 713/176 |
| 2007/0005737 A1 * | 1/2007 | Maki .............................. | 709/222 |
| 2007/0127826 A1 * | 6/2007 | Kishi .............................. | 382/232 |
| 2008/0069457 A1 | 3/2008 | Matsumoto .................... | 382/232 |
| 2009/0021602 A1 * | 1/2009 | Fujiwara et al. ............. | 348/223.1 |
| 2009/0097083 A1 * | 4/2009 | Utsunomiya ................. | 358/518 |
| 2009/0141319 A1 * | 6/2009 | Utsunomiya et al. ......... | 358/505 |
| 2009/0147298 A1 * | 6/2009 | Takahashi et al. ............ | 358/1.15 |
| 2010/0008579 A1 * | 1/2010 | Smirnov ........................ | 382/176 |
| 2012/0008861 A1 * | 1/2012 | Narita ........................... | 382/166 |

FOREIGN PATENT DOCUMENTS

JP      2008-042687      2/2008

* cited by examiner

*Primary Examiner* — Stephen R Koziol
*Assistant Examiner* — Shaghayegh Azima
(74) *Attorney, Agent, or Firm* — Fitzpatrick, Cella, Harper & Scinto (57) ABSTRACT

When image data that contains objects varying in resolution is expanded into bitmap data having a higher print resolution and further compressed in resolution conversion, the compression rate is improved. The resolution and the rendering position of an object are taken into consideration to shift the rendering position of the object so that the boundary of an interpolated area extended from one pixel in the expansion of the object into the bitmap data matches the boundary of a compression rectangular area for use in the resolution compression. Thus, the compression rate of the resolution compression is improved.

6 Claims, 8 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method in which encoding is performed in image processing in order to compress the amount of data for such purposes as reducing memory resources and increasing processing speed.

2. Description of the Related Art

Some of the conventional encoding methods for image compression involve dividing an image into predetermined rectangular areas (referred to as compression rectangular areas or unit rectangular areas) and encoding the image on a rectangular area basis. Further, Japanese Patent Laid-Open No. 2008-042687 proposes a method for achieving a high compression rate in such compression processing. In the proposed method, a resolution conversion unit performs resolution conversion to reduce the resolution of an image, which is then subjected to lossy encoding.

When such a method is used to print image data that contains objects varying in resolution, the image data is first expanded into image data having a print resolution. Then the expanded image data is converted into low-resolution image data as necessary (this is referred to as resolution compression). As such, objects having a resolution that differs from the print resolution are subjected to two resolution conversion processes.

Here, the resolution conversion from a low resolution to a high resolution can be implemented by, for example, using interpolation processing to generate interpolation pixels to be inserted between pixels. Exemplary interpolation processing includes a method in which original pixels are replicated and set as interpolation pixels, and a method in which linear interpolation is performed for original pixels. On the other hand, in the resolution conversion from a high resolution to a low resolution, pixels are removed and thinned out. One resolution compression method generates interpolation data based on the removed pixels and adds the interpolation data to resolution-converted image data in order to allow reversible (i.e., lossless) resolution compression and decompression. When resolution-compressed image data according to this method is decompressed, even the removed pixels can be recovered to their original states by referring to the interpolation data. Exemplary interpolation data may be data indicating the arrangement of differences between a representative value (a representative color) and values of the removed pixels. As another example, the interpolation data may include a bitmap of difference values to indicate that no difference value is included in the bitmap for a pixel with a difference of zero, thereby reducing the data amount of the interpolation data. It is to be understood that, besides a bitmap, there are methods for omitting data corresponding to pixels whose difference from the representative color is zero.

When such resolution conversion is performed to convert image data to high-resolution image data, pixels added for interpolation (interpolation pixels) have color components close to a pixel (an original pixel) on which the interpolation pixels are based. Particularly, in an image interpolated according to the interpolation method of simple replication of an original pixel, the original pixel and interpolation pixels have the same color components. Therefore, in the process of performing the resolution conversion again to reduce the resolution for areas that consist of an original pixel and interpolation pixels, the amount of the interpolation data is reduced and a high compression rate can be achieved.

However, if a pixel area that consists of an original pixel and interpolation pixels obtained by interpolating the original pixel extends across more than one compression rectangular area, discontinuity in color occurs between pixels in the compression rectangular areas. This reduces the compression rate compared to a compression rate that could be achieved for the interpolated image data. In other words, if the boundary of a compression rectangular area is located within a pixel area that consists of an original pixel and interpolation pixels obtained by interpolating the original pixel, the compression rate is reduced.

SUMMARY OF THE INVENTION

The present invention has been made in view of the above conventional cases and is intended to solve the inconvenience described above. That is, the present invention is made to solve a low compression rate caused by the mismatch between the boundary of a compression rectangular area and the boundary of a pixel group interpolated from an original pixel.

The present invention includes an image processing apparatus that performs compression processing for image data, comprising:

an image expansion unit that converts image data containing objects varying in resolution into bitmap image data having a predetermined resolution by performing interpolation processing according to a resolution of each object; and a compression unit that losslessly compresses the bitmap image data by converting each compression area into one pixel having a representative color and associating interpolation data about pixels in the compression area with the one pixel resulting from the conversion, the interpolation data including information indicating the sameness in color of the pixels in the compression area if the pixels in the compression area are the same in color as each other, and including a color difference of each pixel if the pixels in the compression area vary in color, wherein for image data of an object converted into the bitmap image data having the predetermined resolution, the image expansion unit comprises a shifter that shifts a rendering position of the object in the bitmap image data so that a boundary of a pixel area after the interpolation processing corresponding to one pixel before the interpolation processing matches a boundary of a compression area for use in the compression of the bitmap image data by the conversion into one pixel on a compression area basis.

According to the present invention, a reduction in the compression rate of the compression performed by a resolution conversion unit can be avoided, so that a high-resolution image can be held with a smaller amount of data. Therefore, when image processing such as printing is performed for the image, a quality image can be provided with high performance.

Further features of the present invention will become apparent from the following description of exemplary embodiments with reference to the attached drawings.

DESCRIPTION OF THE EMBODIMENTS

The best mode for implementing the present invention will be described below with reference to the drawings. In the description, resolution conversion means a process of converting the resolution of input image data to generate a lower-resolution image data having a lower resolution or a higher-resolution image data having a higher resolution. The resolution as used herein is a term on the assumption that an image in question has a certain size. Without this assumption, the resolution can be simply rephrased as the number of pixels. A compression rectangular area is a unit image area based on which a resolution conversion unit performs resolution compression for an input image. A compression rectangular area may also be simply referred to as a compression area because it can be nonrectangular.

<Apparatus Configuration>

Figure 1:
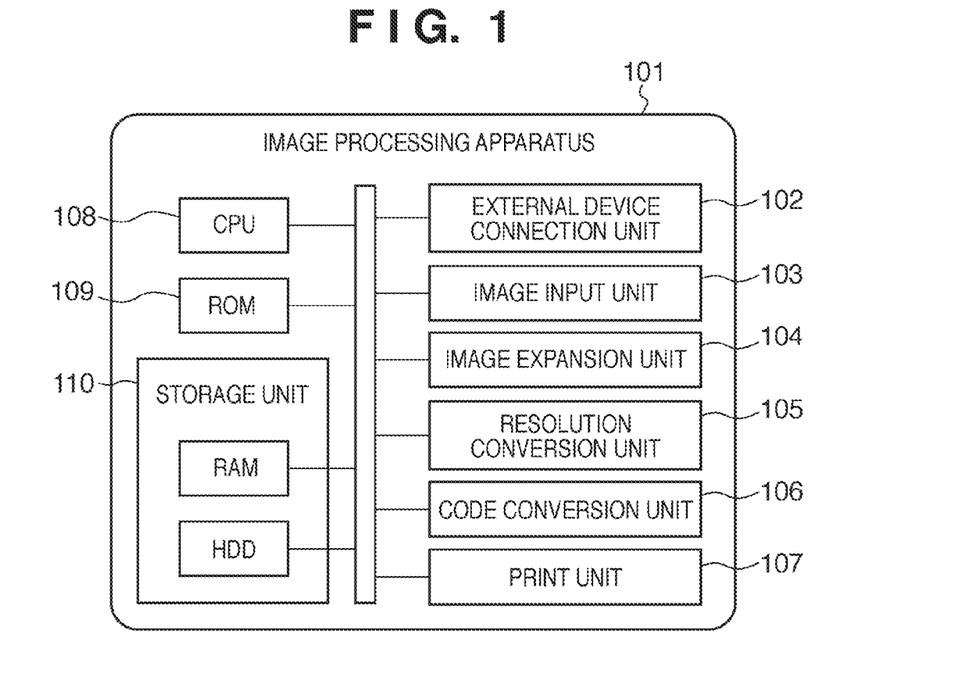
FIG. 1 is a diagram showing a hardware configuration in the present invention.

FIG. 1 shows an exemplary hardware configuration of an image processing apparatus according to an embodiment. An external device connection unit 102 is an interface such as a LAN or USB interface, and data such as image data is transmitted to and received from an external device through connection via this interface. An image input unit 103 can receive data through the external device connection unit 102. Input image data may be data including vector data and composed of objects varying in resolution. Objects here are elements that form an image and include, for example, image objects such as bitmap data, and vector objects such as characters and drawings. An image object consists of pixels, whereas a vector object consists of data about, for example, outlines and colors defining the object. Objects having different resolutions can be included in one image. The data about a vector object is referred to as vector data.

An image expansion unit 104 expands the image data including vector data and composed of objects varying in resolution to generate bitmap image data. The resolution of the generated bitmap image data is predetermined, for example by designating in advance. The image expansion unit 104 generates the bitmap image data having the predetermined resolution (referred to as a designated resolution). For this purpose, if the image data includes an object having a resolution different from the designated resolution, the resolution of the object is converted into the designated resolution. For vector objects, bitmap data having the designated resolution is generated from the vector objects. The objects are combined into the bitmap image data having the designated resolution according to a specified method. Exemplary combination methods include overwriting, and alpha-blending in which the opacity of higher-layer objects is designated.

A resolution conversion unit 105 converts the resolution of the bitmap image data having the designated resolution generated by the image expansion unit 104 to perform resolution compression (for example, thinning out) or decompression (for example, interpolation). The resolution compression is a process of converting pixels in a pixel area serving as a unit for compression processing into one pixel. The resolution compression may be based on methods such as a simple thinning-out method and a method taking the average of pixels in a pixel area serving as a unit for compression processing. In any case, the resolution compression is a process in which a certain representative color is set as a converted pixel value. In the example herein, it is assumed that the resolution compression is thinning-out processing. When performing the resolution compression for the generated bitmap image data, a color information pattern is analyzed for each predetermined compression rectangular area to generate a resolution-compressed lower-resolution image and interpolation data. When the resolution-compressed image data is decompressed, even pixels removed for thinning out can be decompressed reversibly, i.e., into their original states, by referring to the interpolation data. The decompression process is also performed by the resolution conversion unit 105. The interpolation data may be data indicating the arrangement of the differences between a representative value (a representative color) and values of the removed pixels, that is, color differences. As the representative value, a value of a pixel left unremoved can be used, for example. As a further example, data indicating that the value of the representative color and all the other pixels in the compression rectangular area are of the same color (uniformly colored) can be included in the interpolation data. If the compression rectangular area is uniformly colored, the interpolation data can be configured as data indicating the representative value and the pixel arrangement. If the compression rectangular area is not uniformly colored, the interpolation data is configured to indicate a difference value between the representative color and each pixel value according to the pixel arrangement. In this manner, the data amount of the interpolation data can be significantly reduced for uniformly-colored areas. Also, variations in size of the compression rectangular areas can be flexibly addressed. It is to be understood that the above-described interpolation data is only an example. Besides the bitmap, any resolution compression methods that allow the reduction of the data amount of the interpolation data for uniform areas are applicable to the embodiment.

A code conversion unit 106 encodes the image generated by the resolution conversion unit 105 according to a predetermined encoding procedure for still images, such as JPEG, to generate encoded image data. The code conversion unit 106 also conversely decodes encoded image data. It is to be understood that encoding procedures other than JPEG, for example JPEG 2000, may be employed.

A print unit 107 prints the generated image by forming the image on paper with colorants such as toner or ink based on the image data. Various schemes may be employed as a printing mechanism, including electrophotography, inkjet, and thermal transfer. The compressed image data is decoded and decompressed, and then passed to the print unit 107. If the print unit 107 is an external device, the image data is transmitted via an interface.

The image processing apparatus 101 also includes a CPU 108, a ROM 109, and a storage unit 110. The CPU 108 is a control unit of the image processing apparatus 101 and controls the entire apparatus. For example, the CPU 108 causes image data received by the image input unit 103 to be expanded into bitmap image data by the image expansion unit 104 or to be subjected to the resolution conversion. Thus, the CPU 108 controls data transfer and cooperative processing among the component blocks in FIG. 1. Alternatively, units such as the image expansion unit 104, the resolution conversion unit 105, and the code conversion unit 106 may be provided as function blocks implemented by the CPU 108 executing a program.

The ROM 109 is memory that stores control programs executed by the CPU 108 and fixed data. The storage unit 110 is for storing variables of the control programs for the CPU 108 and for storing buffers for use in processes of the image processing apparatus, and includes storage media such as a RAM and an HDD. Data such as input image data may be stored in local memory of each processing block but may also be stored in the storage unit 110.

As the image processing apparatus, FIG. 1 shows an image forming apparatus such as a printer or a copier with the print unit 107. Alternatively, the image processing apparatus 101 may be a computer or the like without the print unit 107 but with an interface for connecting to the print unit 107 over a network or otherwise. In any case, the present invention according to the embodiment is applicable to any configurations that include the image expansion unit 104, the resolution conversion unit 105, and the code conversion unit 106.

Figure 2:
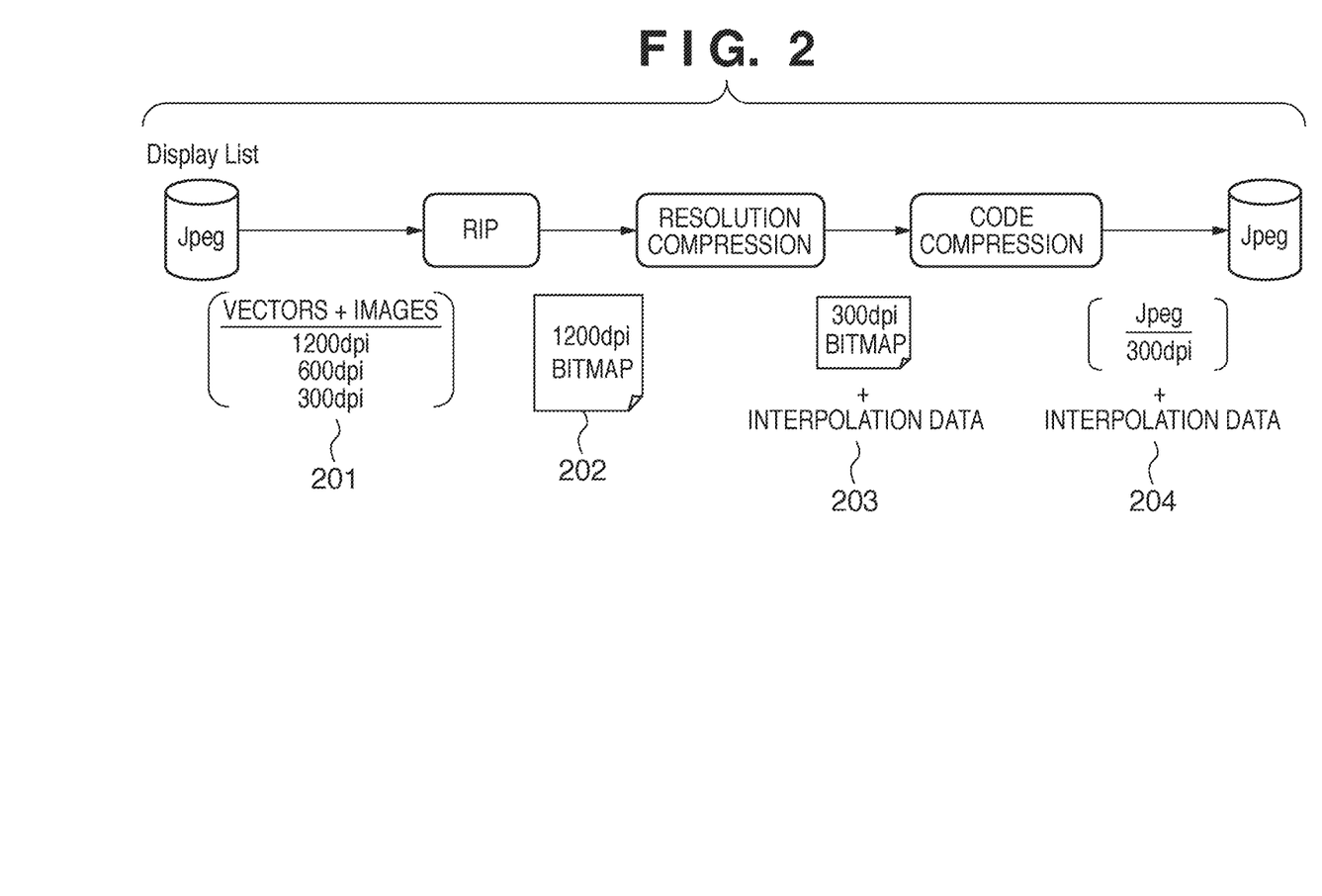
FIG. 2 is a diagram showing an exemplary image flow in a print function through an external device.

FIG. 2 shows an exemplary image flow in a print function through an external device. Image data input by the image input unit 103 includes vector information and is stored as a display list 201 in the storage unit 110. The image data is then RIP-processed by the image expansion unit 104 and expanded into bitmap image data 202 having a print resolution (for example, 1200 dpi). The image data contains objects, and a resolution is set for each object. Therefore, the resolution conversion is performed for each object as necessary to convert the image data into the bitmap image data.

The expanded image data 202 is then subjected to the resolution compression by the resolution conversion unit 105 and converted into image data having a compression resolution (for example, 300 dpi) and interpolation data. This set of data will be referred to as compressed image data 203.

The compressed image data 203 is then encoded (for example, JPEG-encoded) by the code conversion unit 106 to be converted into encoded image data, and stored in the storage unit 110. At this point, any interpolation data is encoded together. The encoded image data and interpolation data will be referred to as encoded data 204.

At the time of printing, the image data compressed and stored according to this procedure is decoded and resolution-decompressed by reversely following this flow, and printed by the print unit 107.

<Resolution Compression>

Figure 3:
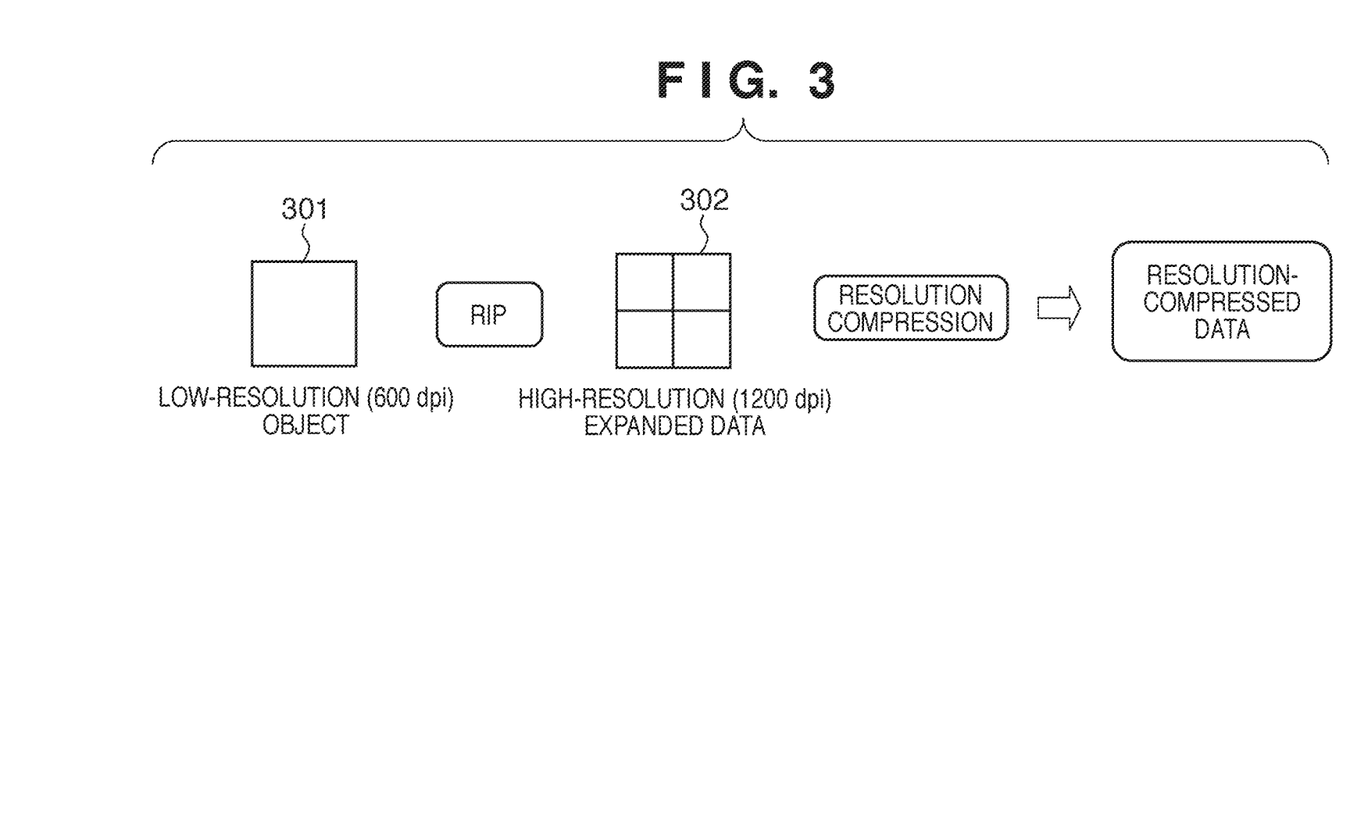
FIG. 3 is a diagram describing resolution conversion for a low-resolution object.

FIG. 3 shows a resolution compression procedure for a low-resolution object. An input image to be subjected to the RIP processing by the image expansion unit 104 contains objects varying in resolution. For example, if an object has a resolution (e.g., 600 dpi) lower than a print resolution (e.g., 1200 dpi), the RIP processing expands an image area 301 of one pixel into an image area 302 of four pixels. In the embodiment, the processing of increasing the resolution by the image expansion unit 104 is interpolation based on the replication of an original pixel. Therefore, color information on each pixel in the image area 302 is the same as the original pixel. Since the resolution conversion unit 105 can perform the resolution compression for these pixels as a single piece of color information, a high compression rate can be achieved as described above.

Figure 4:
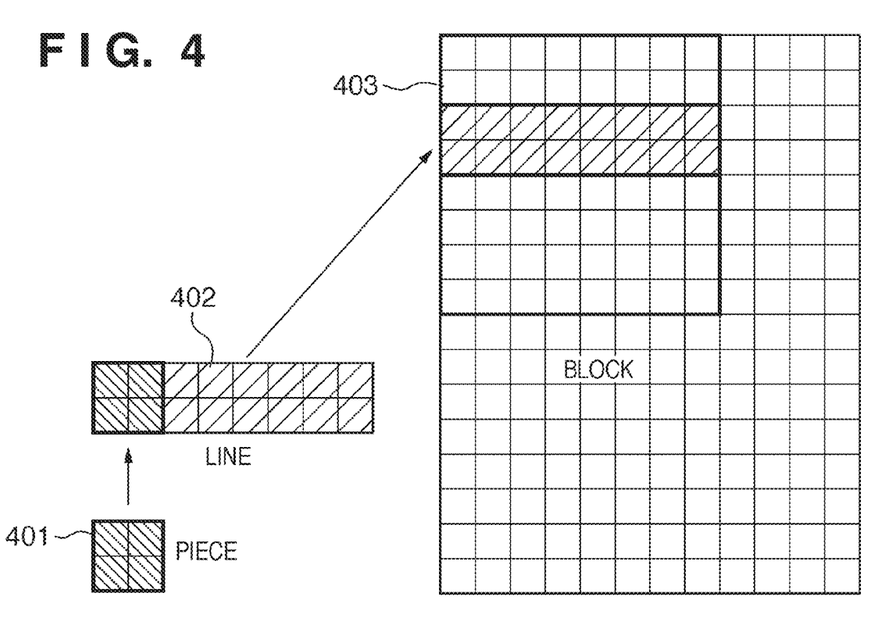
FIG. 4 is a diagram describing compression rectangular areas.

FIG. 4 shows compression rectangular areas for the resolution compression. The resolution compression by the resolution conversion unit 105 in the embodiment uses a plurality of sizes of compression rectangular areas. The resolution conversion unit 105 implements the resolution compression by referring to the color information on pixels in a compression rectangular area and performing uniform-color determination and color-information pattern analysis in the area. For example, a first compression rectangular area 401 is an image area of 2×2 pixels (a basic area, hereinafter referred to as a piece). A second compression rectangular area 402 is an image area of 8×2 pixels (a primary extended area, hereinafter referred to as a line) consisting of a plurality of (in this case, four) horizontally combined pieces. A third compression rectangular area 403 is an image area of 8×8 pixels (a secondary extended area, hereinafter referred to as a block) consisting of a plurality of (in this case, four) vertically combined lines. These sizes of the compression rectangular areas are only examples employed in the embodiment. A piece is a basic target area in performing the resolution compression, and since 2×2 pixels are thinned out to be a 1×1 pixel in the example herein, a piece is an area of 2×2 pixels. Therefore, for example, if 4×4 pixels are thinned out to be one pixel, a piece will be an area of 4×4 pixels. A line is an area spanning an integral multiple of the area of a piece, and as it is called the second compressed rectangular area, a line is desirably a rectangle. The reason for this is that a rectangular line allows the pixel arrangement to be simply described, leading to a higher compression rate in the resolution compression if the line is uniformly colored. At the cost of a reduction in the compression rate, a more complex shape may be employed rather than a rectangle. A block is also an area spanning an integral multiple of the area of a piece and is desirably a rectangle for the same reason as a line. Further, a block desirably consists of a plurality of adjacent lines, because a plurality of adjacent lines determined as uniformly colored can be collectively determined as a uniform-color block.

The wider a uniformly-colored pixel area as a compression rectangular area such as a line or block, the higher the compression rate achieved by the resolution compression. As such, gradually wider areas, like a piece, a line, and a block, are defined for the uniform-color determination. Therefore, for example, a single type of compression rectangular area spanning an integral multiple of the area of a piece may be defined, or four or more types of compression rectangular areas may be defined without being limited to the three types of areas employed in the embodiment.

The resolution conversion unit 105 performs uniform-color determination for each compression rectangular area in order of blocks, lines, and pieces. If the compression rectangular area is uniformly colored, the interpolation data is generated as only the color information and information about the compression rectangular area. A uniformly-colored compression rectangular area means that the area is filled with a uniform color. If a piece is not uniformly colored, the resolution conversion unit 105 analyzes the color information pattern in the piece and generates the interpolation data as the color information pattern.

Here, an exemplary resolution compression procedure performed by the resolution conversion unit 105 will be described. First, a pixel serving as a start point in image data to be subjected to the resolution compression, for example a first pixel in raster order, is taken as a focus pixel. The focus pixel is copied to an area in which a resolution-compressed image is stored (a thinning-out step). The position to which the focus pixel is copied is determined so that compressed pixels are placed in an order corresponding to uncompressed pixels.

The interpolation data is then generated (an interpolation data generation step). For this purpose, first, other pixels in a piece that includes the focus pixel as a pixel at a certain relative position (for example, the upper-left corner) are checked to see whether all the other pixels are the same as the focus pixel, that is, whether this piece is uniformly colored (a uniform-color determination substep). If all the pixels are uniformly colored, a uniform-color flag indicating that the pixels are uniformly colored is set in the interpolation data associated with the focus pixel. Color data on the focus pixel is stored as a representative color in the interpolation data, and data indicating the pixel arrangement (in this case, the arrangement of the piece) is also stored. The pixel arrangement is represented with respect to the focus pixel, for example. If the area is rectangular as in the example herein, the pixel arrangement can be indicated in terms of the number of rows and columns of pixels. The focus pixel can be associated with the interpolation data by placing the interpolation data in the same order as the compressed pixel, for example. The association can also be made by providing a link.

If the pixels are not uniformly colored, the uniform-color flag indicating that the pixels are uniformly colored is reset in the interpolation data associated with the focus pixel. Color data of the representative color, data indicating the pixel arrangement, and a difference value of each pixel from the representative color are stored in the interpolation data.

The above procedure is repeated while the focus pixel is advanced on a piece basis. As a result, the resolution-compressed data subjected to the resolution compression and the piece-based interpolation data are obtained for the entire area of the image data.

Further, the pixel groups subjected to the resolution compression on a piece basis are again compressed on a line basis. This is a process of determining that pieces that are uniformly colored themselves and also uniformly colored with each other are lined up in an area for one line (in the example herein, 1×4 pieces), and if so, replacing the group of pieces with one line. The resolution compression data on the group of pixels in the line is represented by the resolution compression data on one pixel (that is, the other pixels are deleted). Also, the pixel arrangement in the interpolation data is rewritten from a piece to a line, and this interpolation data is associated with the pixel representing the line in the compressed image data (the interpolation data on the deleted pixels is deleted). In this manner, the compression rate can be further increased.

Further, the pixel groups subjected to the resolution compression on a piece basis are again compressed on a block basis. This is a process of determining that pieces that are uniformly colored themselves and also uniformly colored with each other are lined up in an area for one block (in the example herein, 4×4 pieces), and if so, replacing the group of pieces with one block. The resolution compression data on the group of pixels in the block is represented by the resolution compression data on one pixel (that is, the other pixels are deleted). Also, the pixel arrangement in the interpolation data is rewritten from a piece to a block, and this interpolation data is associated with the pixel representing the block in the compressed image data (the interpolation data on the deleted pixels is deleted). In this manner, the compression rate can be further increased. Since a block consists of four lines in the example herein, it is also possible to replace 1×4 uniformly-colored lines with one block.

Instead of the above step-by-step compression on a line basis and on a block basis, the resolution compression may be performed on a line basis if a uniformly-colored area ranges over 2×8 pixels, or on a block basis if a uniformly-colored area ranges over 8×8 pixels.

Thus, the resolution compression can be implemented through the above procedure. The above procedure is only an example. Other procedures may be employed in which a compression rectangular area that is eventually determined as uniformly-colored on a piece basis, line basis, or block basis is represented by one pixel and data indicating the pixel arrangement in the rectangular area is associated with the representative pixel as the interpolation data.

<Interpolation Area and Compression Rectangular Area>

Figure 5:
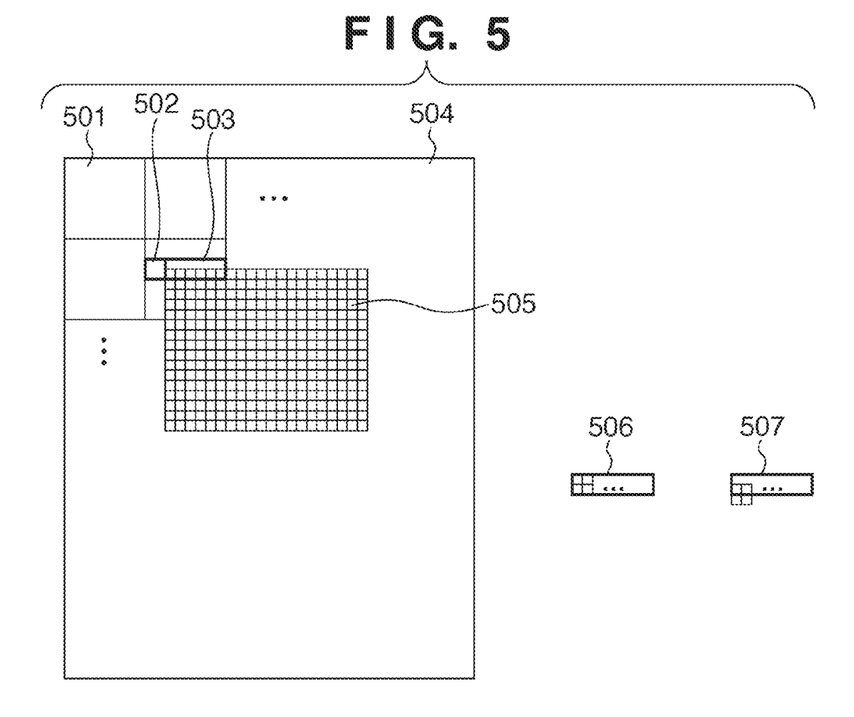
FIG. 5 is a diagram describing object rendering positions and compressed rectangular areas.

FIG. 5 shows the relationship between an object rendering position and the compressed rectangular areas. A compression rectangular area 501 represents a block, a compression rectangular area 502 represents a piece, and a compression rectangular area 503 represents a line. Image areas 504 and 505 are bitmap images having a print resolution, for example 1200 dpi, expanded by the image expansion unit 104. The image area 504 corresponds to an object originally having 1200 dpi, such as a character area or a background area. The image area 505 corresponds to an object that had a resolution (for example, 600 dpi) lower than the print resolution, such as a graphic area, in the image data before expanded by the image expansion unit 104.

As described in FIG. 3, in the image area 505, every 2×2 pixels consisting of an original pixel and interpolation pixels generated from the original pixel are uniformly colored, so that the object is determined as uniformly colored at least on a piece basis. Therefore, it can be considered that a high compression rate is achieved by the resolution conversion unit 105.

However, depending on the object rendering position in the image expansion unit 104 and the positions of the compression rectangular areas in the resolution conversion unit 105, a piece or a line may not be determined as uniformly colored and the compression rate may be reduced. That is, if the area of a pixel group interpolated in the resolution conversion by the image expansion unit 104 extends across the boundary of a compression rectangular area for the thinning-out process by the resolution conversion unit 105, pixels in the compression rectangular area may not necessarily be uniformly colored. In this case, the compression rate of the resolution compression can be significantly reduced.

The positional relationships between the first and second compression rectangular areas 502 and 503 and the image area 505 are shown at 506 and 507 in FIG. 5. The case of 506 illustrates that an interpolation pixel area and the compression rectangular areas 502 and 503 in the image area 505 match each other. A pixel area generated in the interpolation by the image expansion unit 104 from one original pixel is shown as a 2×2 pixel area within the compression rectangular area 502. In this 2×2 pixel area, one pixel (for example, the pixel at the upper-left corner) is the original pixel of 600 dpi, and the remaining three pixels are interpolation pixels resulting from replicating the original pixel. This 2×2 pixel area will be referred to as an interpolated area. That is, an interpolated area is a pixel area after the interpolation processing corresponding to one pixel before the interpolation processing. In the case of 506, the interpolated area, i.e., one pixel in the unexpanded image, fits into the compression rectangular area 503. Accordingly, at least the boundary of the interpolated area and the boundary of the piece match each other. Therefore, the piece is uniformly colored. Since the piece is uniformly colored, a line can also be determined as uniformly colored. If the line is uniformly colored, a block that includes the line can also be determined as uniformly colored.

The case of 507 illustrates that the object rendering position and the compression rectangular areas 502 and 503 do not match each other. In the case of 507, the interpolated area, i.e., one pixel in the unexpanded image, extends across the boundary of the compression rectangular area 503. Therefore, the piece may not necessarily be uniformly colored. If the piece is not uniformly colored, a line that includes the piece is not uniformly colored, and a block that includes the line is not uniformly colored. Therefore, the compression rate is likely to be reduced.

Figure 6:
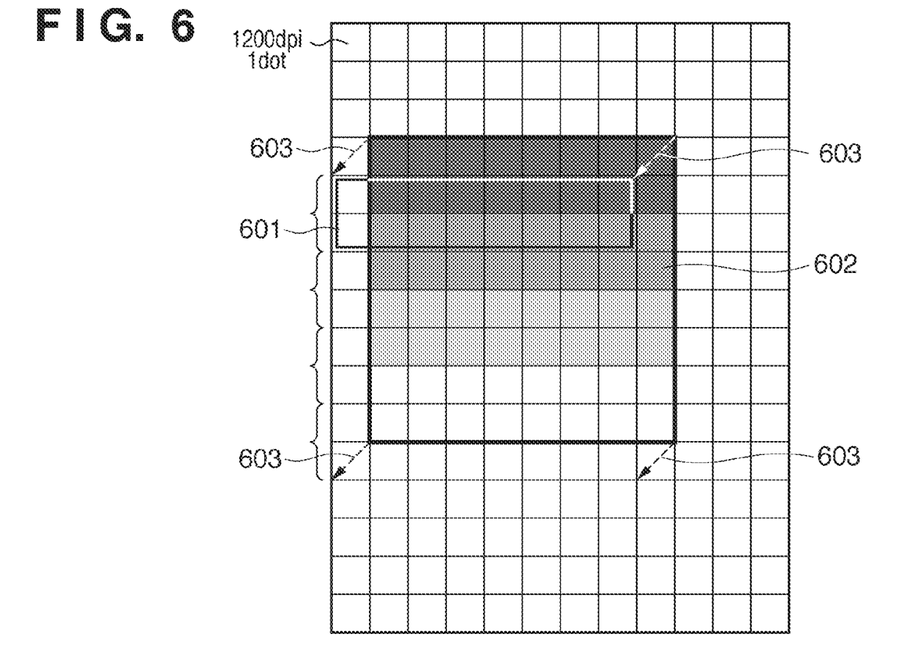
FIG. 6 is a diagram showing an image before the present invention is implemented.
Figure 7:
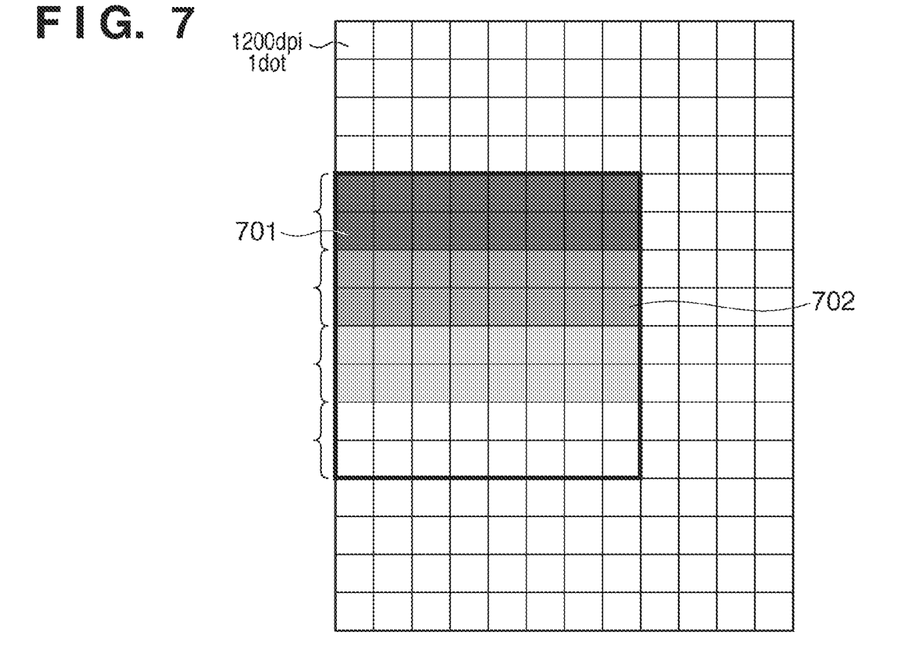
FIG. 7 is a diagram showing an image after the present invention is implemented.

FIG. 6 shows an exemplary image in a case where the present invention according to the embodiment is not implemented when the object rendering position and the compression rectangular area do not match each other as shown at 507 in FIG. 5. FIG. 7 shows an exemplary image in a case where the present invention according to the embodiment is implemented.

In FIG. 6, a compression rectangular area 601 indicated by a double-line frame is a line of 8×2 pixels that consists of four pieces. An image area 602 indicated by a heavy-line frame is an area of 8×8 pixels representing an image resulting from expanding an object of 600 dpi into an object of 1200 dpi. It is assumed here that the image area 602 is a gradation image in which a horizontally uniform color changes vertically. With respect to the position of the compression rectangular area 601, the image area 602 is located so that the expanded interpolated area, i.e., one pixel in the unexpanded image, extends across the boundary of the compression rectangular area 601. Accordingly, the line, which is the compression rectangular area 601, is not determined as uniformly colored. Also, any of the four pieces constituting the compression rectangular area 601 is not uniformly colored because at least the upper pixels differ in color from the lower pixels. This is also the case in other compression rectangular areas located within the image area 602, so that pieces and lines are not determined as uniformly colored and the compression rate is significantly reduced. Of course, a block to which the line is extended in the short side direction (i.e., vertically) is not uniformly colored.

In contrast, according to the present invention in the embodiment, image shift processing is performed in which the rendering position of the image area 602 is shifted with respect to the compression rectangular area 601. Specifically, the image area 602 is shifted so that the rendering start position (the upper-left corner) in the image area 602 is aligned with the area start position (the upper-left corner) of a piece. This shift is shown by an arrow 603 in FIG. 6.

As a result, as in FIG. 7, the one pixel in the unexpanded image of an image area 702 fits into a compression rectangular area 701. Therefore, pieces in the compression rectangular areas 701, as well as pieces in other compression rectangular areas located within the image area 702 are uniformly colored. In the example of FIG. 7, lines can also be determined as uniformly colored, so that a further higher compression rate can be achieved.

<Shift Processing in Image Expansion>

Figure 8:
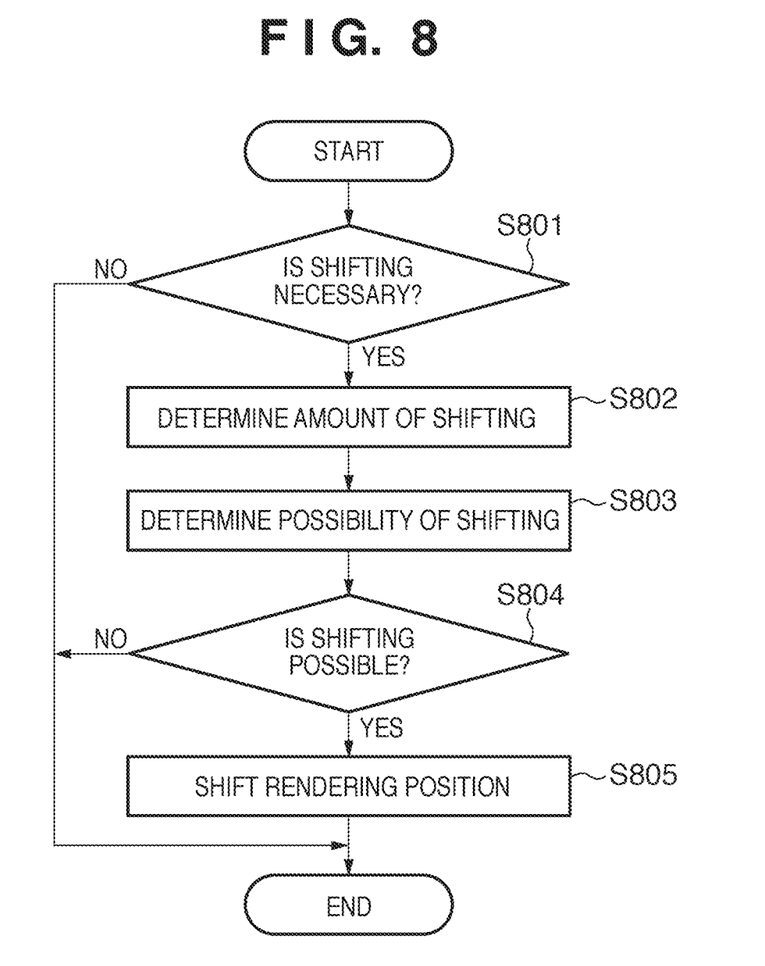
FIG. 8 is a diagram showing a flowchart of image shift processing in the present invention.

FIG. 8 shows a flowchart of the image shift processing in the embodiment. The image shift processing is performed by the image expansion unit 104 for each object when the bitmap image data is generated. The description here assumes a print resolution of 1200 dpi, pieces of 2×2 pixels, and lines of 8×2 pixels.

In step S801, the image expansion unit 104 determines whether or not the image shift processing is necessary for a target object to be processed. For this purpose, the image expansion unit 104 analyzes the resolution and the rendering position of the target object. The resolution of the target object before expanded into the bitmap can also be referred to. In the embodiment, the image expansion unit 104 determines that the image shift processing is necessary if the print resolution is 2N times (N is a positive integer) the resolution of the target object and if either X or Y of the rendering start position (X, Y) of the target object is at an M-th pixel (M is a positive integer). (X, Y) is coordinates indicating the position of a pixel in the image data, where (0, 0) corresponds to a pixel at the start point. More generally, these conditions can be described as follows. M denotes the ratio of the print resolution and the object resolution (the print resolution/the object resolution), N×N denotes the number of pixels in a piece, which is the basic area, (X, Y) denotes the rendering start position of the target object, and an operation "a mod b" denotes a residue of dividing a by b. Then, if (M mod N)=0 and (X mod N)=0 and (Y mod N)=0, the boundary of the compression rectangular area and the boundary of the interpolated area for the resolution conversion of the target object match each other. Here, M is the number of pixels on a side of the interpolated area to which one pixel is extended by the interpolation when the object is converted to print resolution. For example, if M=2, one pixel is converted into 2×2 pixels. (M mod N)=0 indicates that the number of pixels on a side of the interpolated area is a multiple of the number of pixels on a side of the compression rectangular area. (X mod N)=0 and (Y mod N)=0 indicates that the rendering start position of the object matches the position of the pixel left unremoved for thinning out in the compression rectangular area (in the example herein, the pixel at the upper-left corner). The object is shifted in order to change the conditions on the rendering start position (X, Y) of the object. Therefore, if the condition (M mod N)=0 is not met, the boundary of the compression rectangular area and the boundary of the interpolated area cannot match each other even if the rendering start position of the object is shifted. Accordingly, the conditions for shifting the target object are (M mod N)=0 and ((X mod N)≠0 or (Y mod N)≠0). If these conditions are met, the target object is shifted. Otherwise, the target object is not shifted.

If it is determined that the shift processing is necessary, the process proceeds to step S802. Otherwise, the process terminates. In step S802, the image expansion unit 104 determines the amount of shifting for the object shift processing. The image expansion unit 104 computes the amount of shifting for any piece adjacent to a piece that includes the pixel at the rendering start position of the target object. For example, for the image shift 603 in FIG. 6, the image shift processing is performed for a piece adjacently located below, where the amount of shifting is computed as (−1, +1). More generally, the amount of shifting may be (X mod N) in the X direction, and (Y mod N) in the Y direction. A positive shift value indicates the leftward direction for the X-axis, and the upward direction for the Y-axis. A negative shift value indicates the rightward direction for the X-axis, and the downward direction for the Y-axis. Of course, various choices are possible for the shifting direction and distance. For example, if (Z mod N)>N/2 (Z is X or Y), the amount of shifting may be (Z mod N)−N. This allows a smaller amount of shifting.

In step S803, the image expansion unit 104 determines whether or not shifting is actually possible for the amount of shifting determined in step S802. This will be described in detail in FIGS. 9A, 9B, and 9C. In step S804, if it is determined in step S803 that the shifting is possible, the process proceeds to step S805. Otherwise, the process terminates. In step S805, the image expansion unit 104 shifts the rendering position of the target object according to the amount of shifting determined in step S802.

The process of FIG. 8 is performed for all objects to be processed for the image data generation processing.

Figure 9A:
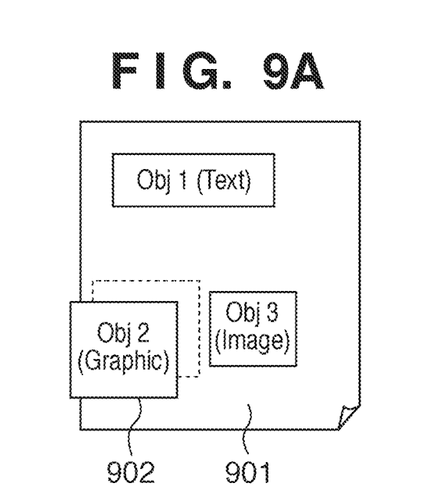
FIGS. 9A, 9B, and 9C are diagrams describing determination of the possibility of shifting in the present invention.
Figure 9B:
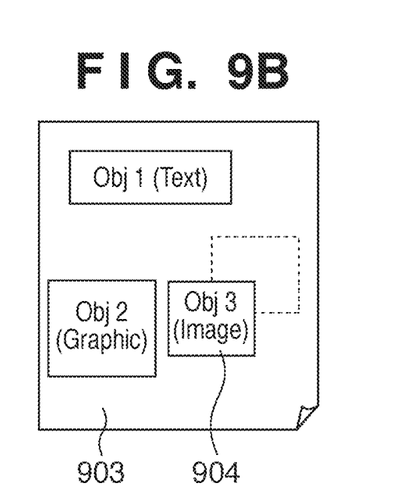
Figure 9C:
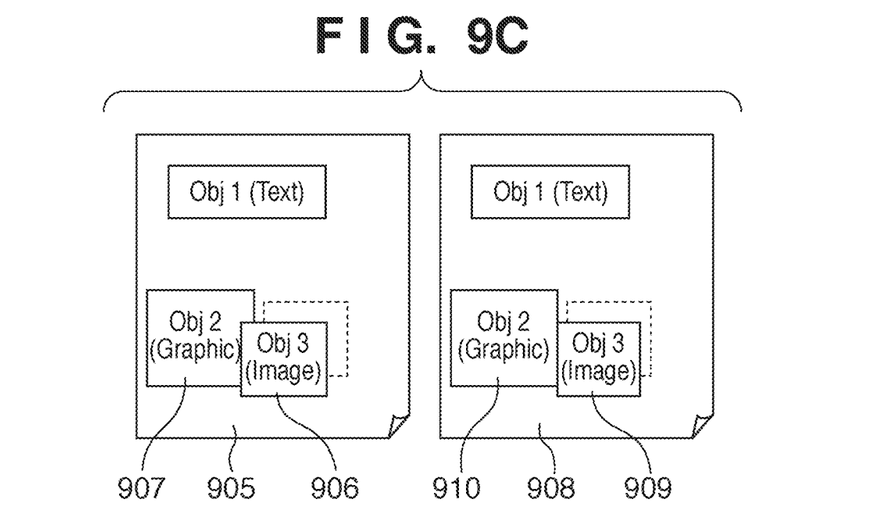

FIGS. 9A, 9B, and 9C show the process of determining the possibility of the shifting in step S803. For the amount of shifting determined in step S802, the image expansion unit 104 determines whether the rendering position of the target object can be actually changed.

For example, an image 901 in FIG. 9A indicates that the image shift processing for an object 902 causes the object 902 to be partially outside the image area. In this case, the image processing apparatus 101 determines that the shifting is impossible. That is, if X<0, or Y<0, or W>Cmax, or Z>Lmax, then it is determined that the shifting is impossible, where the object is rectangular, (X, Y) denotes the rendering start position after the shifting, (W, Z) denotes the end position, and the rendering range of the image data is 0 to Cmax for X-axis and 0 to Lmax for Y-axis.

An image 903 in FIG. 9B indicates that the amount of shifting exceeds a predetermined threshold in the image shift processing for an object 904. In this case, the image processing apparatus 101 determines that the shifting is impossible. This determination can be made by comparing the absolute value of the amount of shifting determined in step S802 with the threshold to determine that the shifting is impossible if the absolute value is greater than the threshold. This is for preventing the object from being moved too far from the originally defined position.

An image 905 in FIG. 9C indicates that an object 906 overlaps the area of an adjacent object 907 in the image shift processing for the object 906. In this case, the image processing apparatus 101 determines that the shifting is impossible. An image 908 indicates that an object 909 just contacts the area of an adjacent object 910 in the image shift processing for the object 909. In these cases, the image processing apparatus 101 determines that the shifting is impossible. This determination is made as follows. It is determined whether or not any of the pixels constituting shifted sides of an object to be shifted contact or overlap another object. If any pixel touches or overlaps another object, it is determined whether or not that pixel contacts or overlaps a pixel of the other object before the shifting. If the object that originally does not contact nor overlap the other object will contact or overlap the other object due to the shift processing, it is determined that the shifting is impossible. Otherwise, the image processing apparatus 101 determines that the shifting is possible. The determination result is stored in memory, for example, and referred to in step S804.

Figure 10:
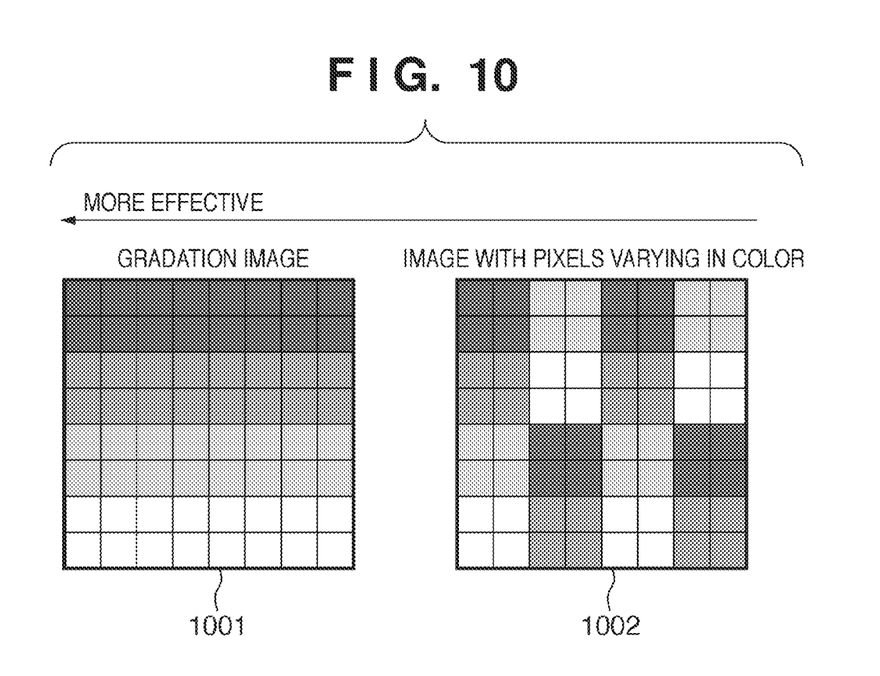
FIG. 10 is a diagram describing effects of the present invention and image patterns.

FIG. 10 shows effects of the present invention according to the embodiment and image patterns. FIG. 10 illustrates objects expanded into the print resolution. A horizontal gradation image like an image 1001 in which the color vertically changes is determined as uniformly colored on a piece or line basis as described above in FIGS. 6 and 7. Therefore, a high compression rate can be achieved, resulting in effective resolution compression. Even if an object before expanded by the image expansion unit 104 is an image with pixels varying in color like an image 1002, the image is determined as uniformly colored at least on a piece basis. Therefore, a high compression rate can be achieved compared to a case where the present invention according to the embodiment is not implemented.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-296377, filed Dec. 25, 2009, which is hereby incorporated by reference herein in its entirety.

What is claimed is:

1. An image processing apparatus that performs compression processing for image data, comprising:
    an image expansion unit that converts image data containing objects into bitmap image data having a predetermined resolution by performing interpolation processing according to a resolution of each object; and
    a compression unit that losslessly compresses the bitmap image data by converting each of pieces included in the bitmap image into a representative color of each of the pieces and interpolation data of each of the pieces, the representative color being a color of a focus pixel at a certain position of each of the pieces, the interpolation data including information indicating the sameness in color of the pixels in a piece if all of the pixels in the piece are the same in color as each other, and the interpolation data including information about color of pixels other than the focus pixel and information indicating an arrangement of the pixels in a piece if all of the pixels in the piece are not the same in color,
    wherein the image expansion unit shifts a rendering position of each of the objects in the bitmap image data so that a boundary of rendering a start position of each of the objects matches a boundary of one of the pieces used in the lossless compression of the bitmap image data when the image expansion unit converts the image data containing the objects into the bitmap image data.

2. The image processing apparatus according to claim 1, wherein
    if an object is to be shifted to fail to fall within the bitmap image data, or if an amount of shifting is to exceed a threshold, or if an object is to be shifted to touch or overlap another object, the image expansion unit refrains from shifting the rendering position of the object.

3. The image processing apparatus according to claim 1, further comprising a sender for decompressing the bitmap image data compressed by said compression unit and sending the decompressed bitmap image data to a print unit.

4. An image forming apparatus comprising a print unit for decompressing the bitmap image data compressed by said compression unit of the image processing apparatus according to claim 1 and printing the decompressed bitmap image data.

5. A processor-based image processing method in an image processing apparatus that performs compression processing for image data, comprising:
    an image expansion step of converting image data containing objects into bitmap image data having a predetermined resolution by performing interpolation processing according to a resolution of each object; and a compression step of losslessly compressing the bitmap image data by converting each of pieces included in the bitmap image into a representative color of each of the pieces and interpolation data of each of the pieces, the representative color being a color of a focus pixel at a certain position of each of the pieces, the interpolation data including information indicating the sameness in color of the pixels in a piece if all of the pixels in the piece are the same in color as each other, and the interpolation data including information about a color of pixels other than the focus pixel and information indicating an arrangement of the pixels in a piece if all of the pixels in the piece are not the same in color, wherein said image expansion step shifts a rendering position of each of the objects in the bitmap image data so that a boundary of rendering a start position of each of the objects matches a boundary of one of the pieces used in the lossless compression of the bitmap image data when the image data containing the objects is converted into the bitmap image data in the image expansion step.

6. A non-transitory medium having recorded therein a program for causing a computer to perform an image processing method, the image processing method comprising:

an image expansion step of converting image data containing objects into bitmap image data having a predetermined resolution by performing interpolation processing according to a resolution of each object; and a compression step of losslessly compressing the bitmap image data by converting each of pieces included in the bitmap image into a representative color of each of the pieces and interpolation data of each of the pieces, the representative color being a color of a focus pixel at a certain position of each of the pieces, the interpolation data including information indicating the sameness in color of the pixels in a piece if all of the pixels in the piece are the same in color as each other, and the interpolation data including information about a color of pixels other than the focus pixel and information indicating an arrangement of the pixels in a piece if all of the pixels in the the piece are not the same in color, wherein said image expansion step shifts a rendering position of each of the objects in the bitmap image data so that a boundary of rendering a start position of each of the objects matches a boundary of one of the pieces used in the lossless compression of the bitmap image data when the image data containing the objects is converted into the bitmap image data in the image expansion step.

\* \* \* \* \*